United States Patent

Boucher et al.

[11] Patent Number: 5,906,419
[45] Date of Patent: May 25, 1999

[54] WHEEL MOUNTING ASSEMBLY FOR INSTALLING A TRANSMISSION-BASED ANTI-LOCK BRAKING SYSTEM SENSOR THEREON

[75] Inventors: Paul Y. Boucher, Tecumseh; Leslie T. Davey, Windsor, both of Canada

[73] Assignee: Tooling Technology Centre, Inc., Windsor, Canada

[21] Appl. No.: 08/761,188

[22] Filed: Dec. 5, 1996

Related U.S. Application Data

[60] Provisional application No. 60/008,331, Dec. 7, 1995.

[51] Int. Cl.$^6$ .................................................. B60B 27/00
[52] U.S. Cl. ................................. 301/105.1; 188/181 R; 384/448; 324/173
[58] Field of Search ........................... 301/105.1, 124.1, 301/126, 131; 280/432; 188/181 R; 384/446, 448; 324/173, 174, 207.2, 207.22

[56] References Cited

U.S. PATENT DOCUMENTS

| | | |
|---|---|---|
| 1,785,423 | 12/1930 | Ortiz . |
| 1,903,136 | 3/1933 | Reid . |
| 2,085,662 | 5/1937 | Johnson . |
| 2,089,607 | 8/1937 | Hill . |
| 2,240,564 | 5/1941 | Le Tourneau . |
| 2,788,224 | 4/1957 | Ramun et al. . |
| 3,024,931 | 3/1962 | Grover et al. . |
| 3,890,517 | 6/1975 | Marsh et al. ..................... 324/173 X |
| 3,978,357 | 8/1976 | Voelbel et al. ..................... 188/181 R |
| 4,069,435 | 1/1978 | Wannerskog et al. ............ 188/181 R |
| 4,154,352 | 5/1979 | Fowler . |
| 4,383,791 | 5/1983 | King . |
| 4,813,842 | 3/1989 | Morton . |
| 4,902,188 | 2/1990 | Page . |
| 4,990,049 | 2/1991 | Hargrove . |
| 5,035,462 | 7/1991 | Page et al. . |
| 5,098,146 | 3/1992 | Albrecht et al. . |
| 5,129,671 | 7/1992 | Walton . |
| 5,137,300 | 8/1992 | Walton . |
| 5,201,628 | 4/1993 | Driver . |
| 5,267,779 | 12/1993 | Talamantez, Jr. et al. . |
| 5,288,197 | 2/1994 | Harris . |
| 5,297,653 | 3/1994 | Wurtz et al. . |
| 5,342,105 | 8/1994 | Miles . |
| 5,344,121 | 9/1994 | Baziuk . |
| 5,354,092 | 10/1994 | Calvert . |
| 5,366,035 | 11/1994 | Hayashida et al. . |
| 5,476,272 | 12/1995 | Hixson, II ..................... 301/105.1 X |
| 5,642,042 | 6/1997 | Goosens et al. ..................... 384/448 X |

FOREIGN PATENT DOCUMENTS

| | | |
|---|---|---|
| 505878 | 9/1954 | Canada . |
| 1004187 | 1/1977 | Canada . |
| 2145259 | 9/1995 | Canada . |
| 1511789 | 2/1968 | France . |
| 2175567 | 12/1986 | United Kingdom . |
| 2276128 | 9/1994 | United Kingdom . |
| WO 96/34778 | 11/1996 | WIPO . |

OTHER PUBLICATIONS

Brochure dated 1989 entitled "Say G'day to the . . . Kelpie Kargo . . . The World's First Fair–Dinkum* Pick–Up Truck".

*Primary Examiner*—Russell D. Stormer
*Attorney, Agent, or Firm*—Raphael A. Monsanto; Benita J. Rohm

[57] ABSTRACT

A wheel mounting assembly for installing a transmission-based anti-lock braking system sensor thereon has a stub axle. An anti-lock braking system sensor is mounted relative to the stub axle. A hub is rotatably mounted on the stub axle. A disc is mounted for rotation with the hub. The disc has a plurality of apertures circumferentially spaced on a face thereof for passing the anti-lock braking system sensor as the disc rotates.

3 Claims, 13 Drawing Sheets

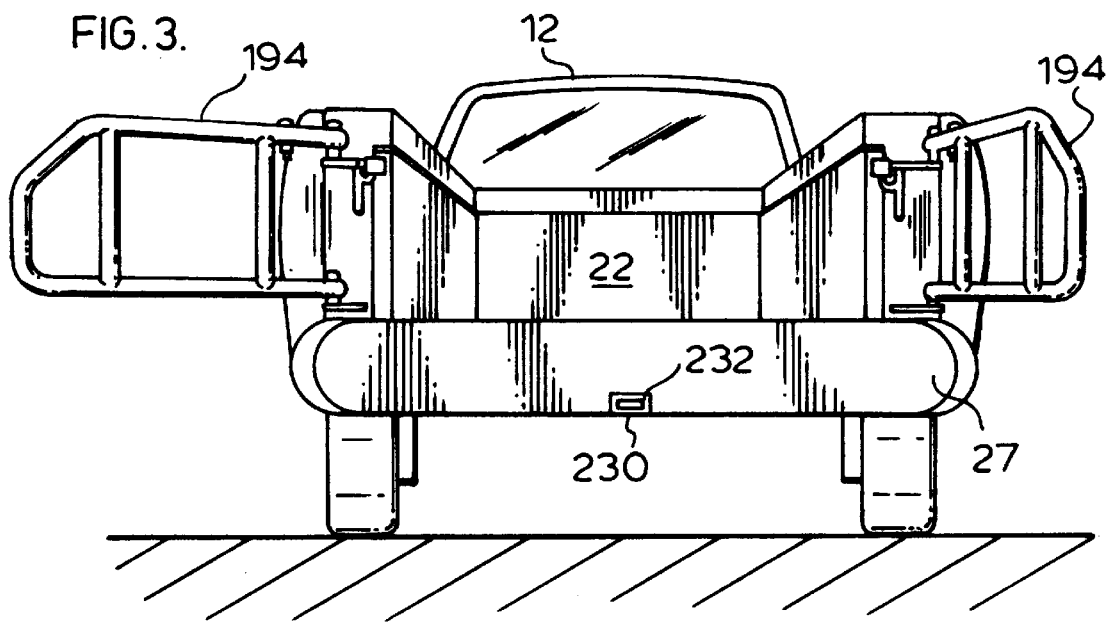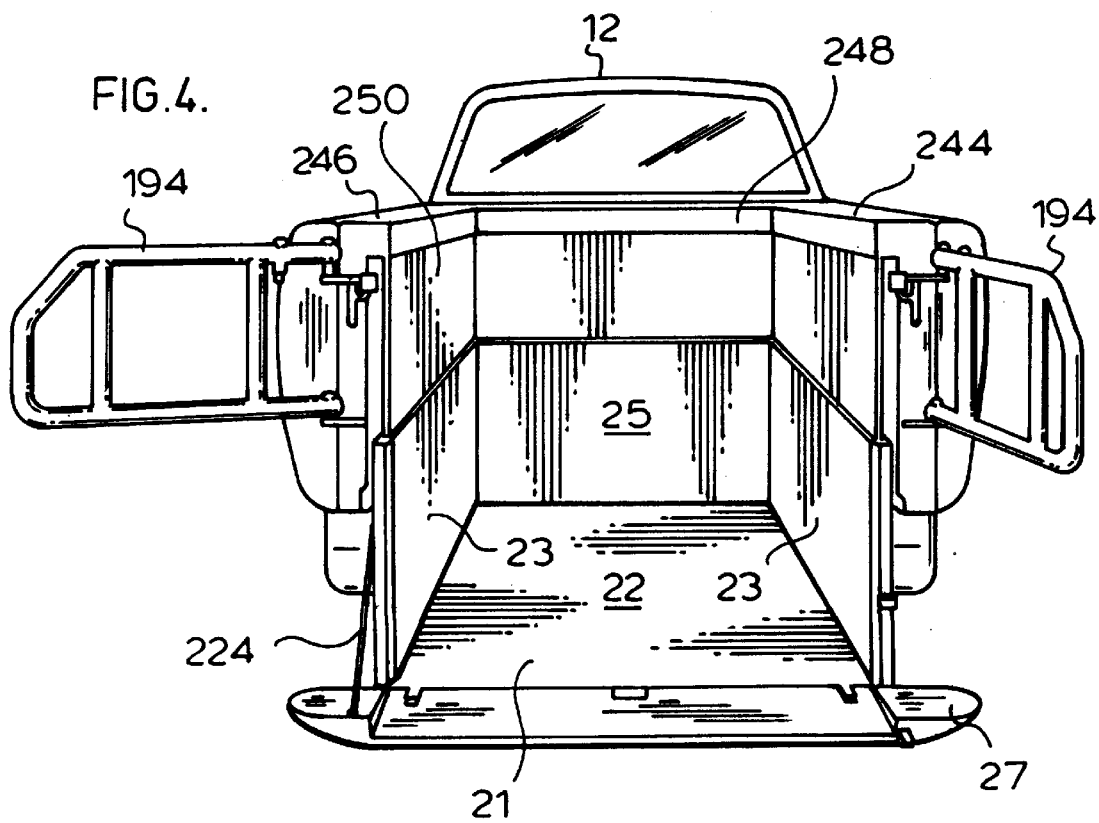

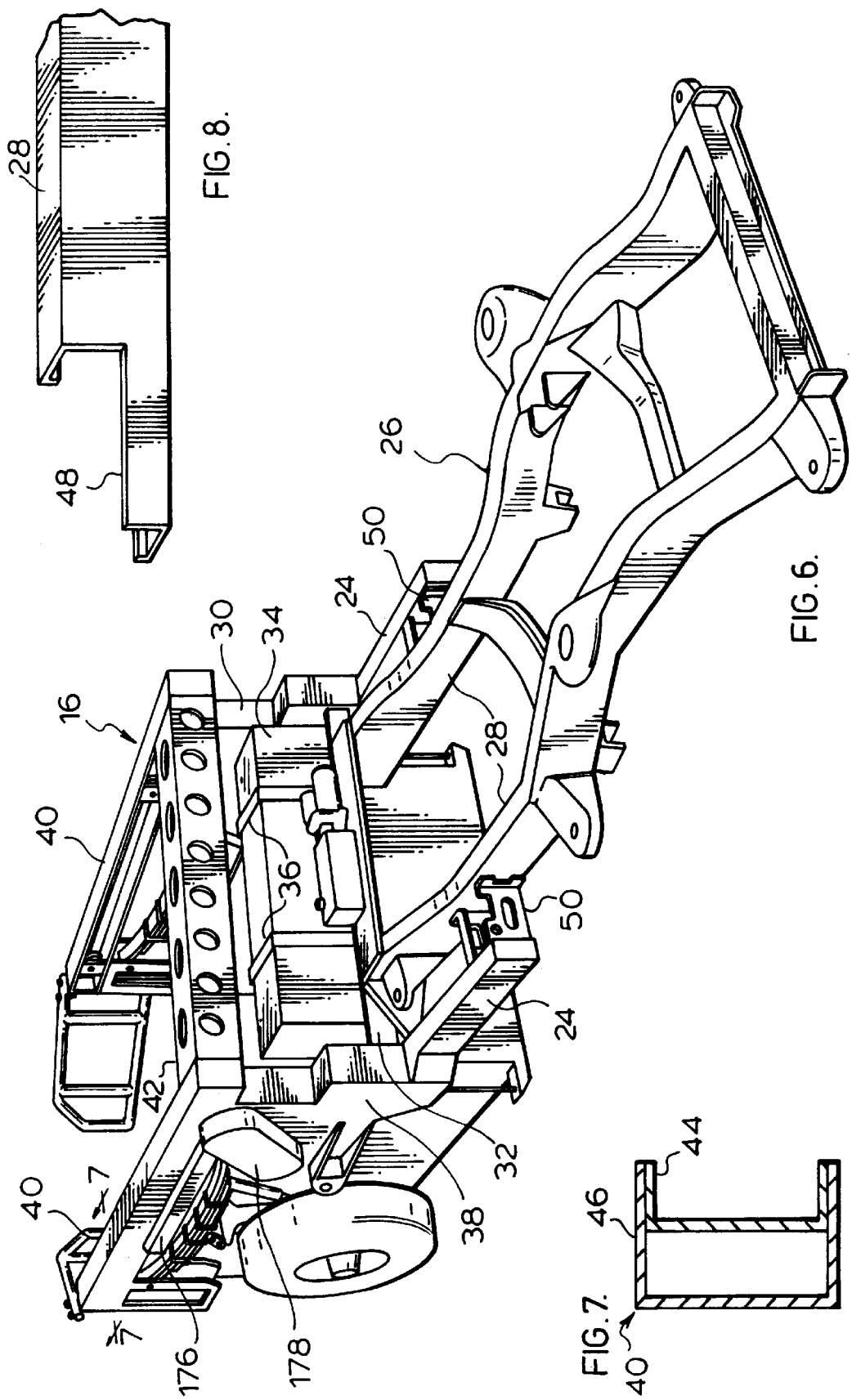

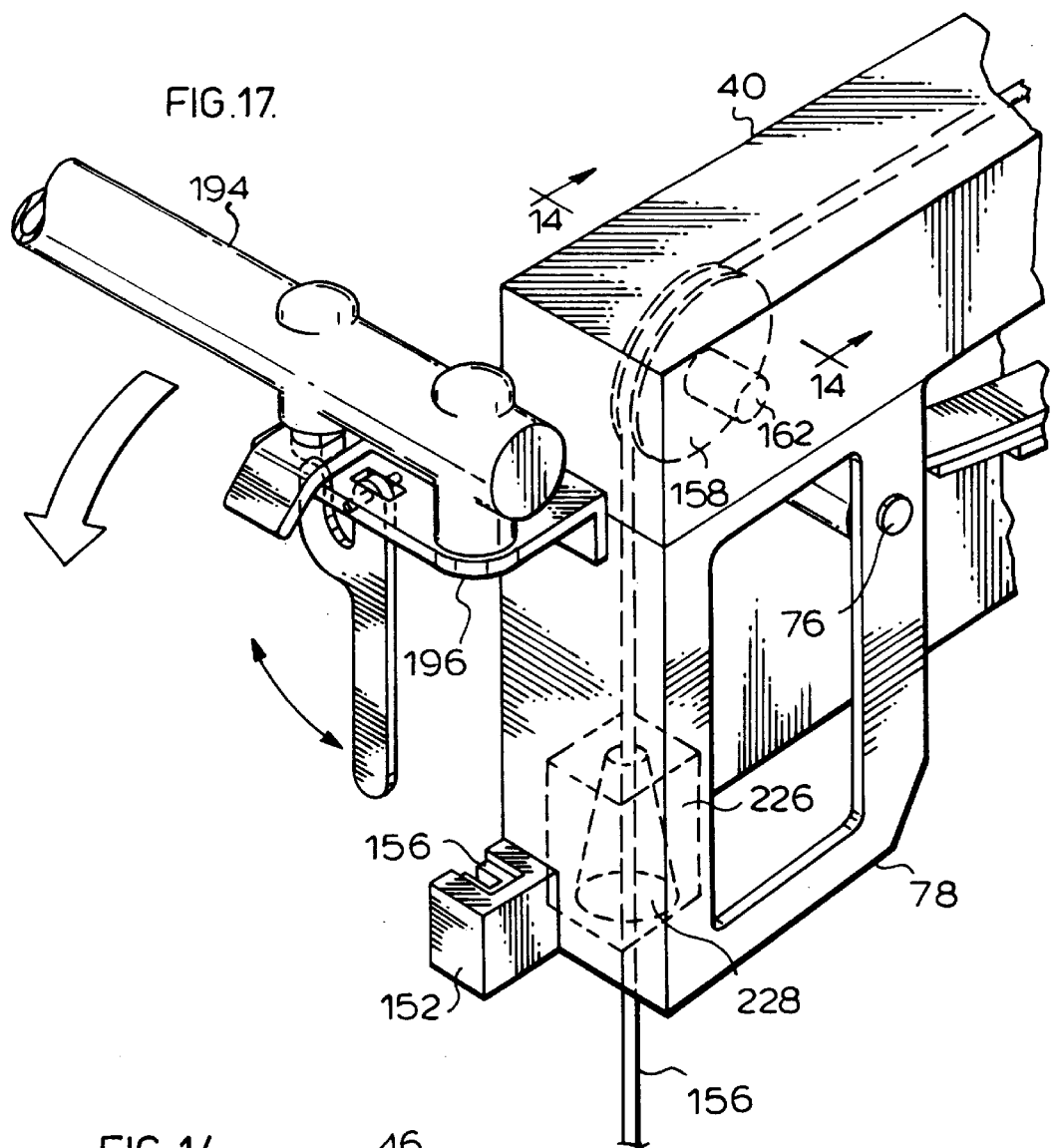
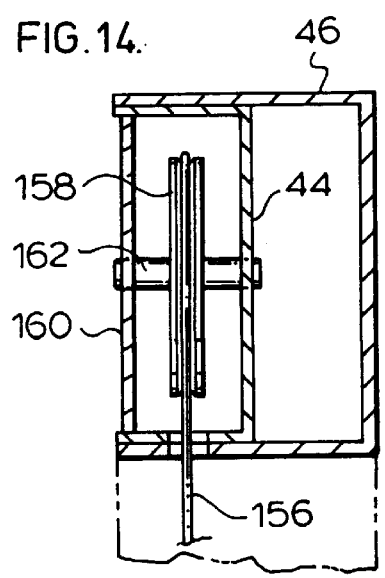

FIG. 21.
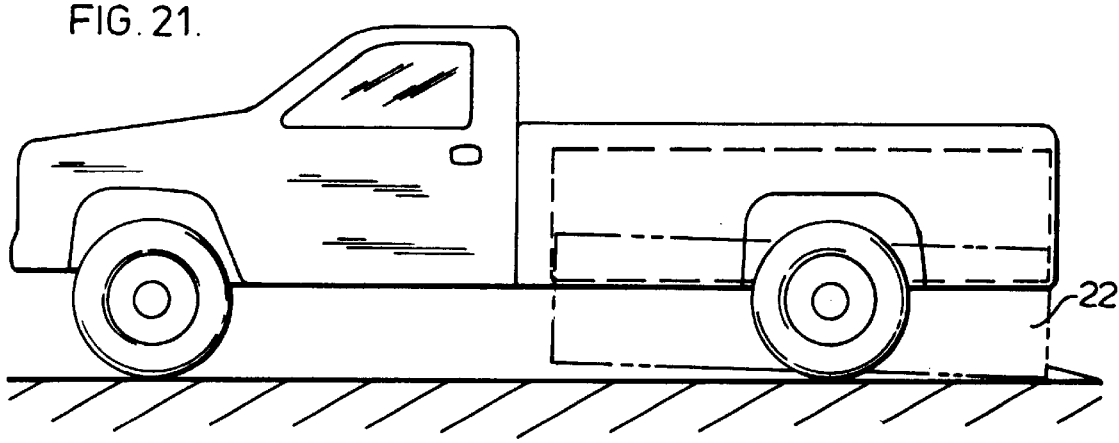
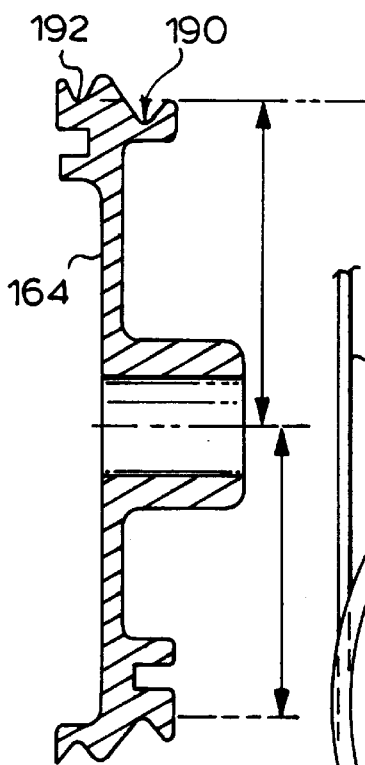
FIG. 15.
FIG. 16.
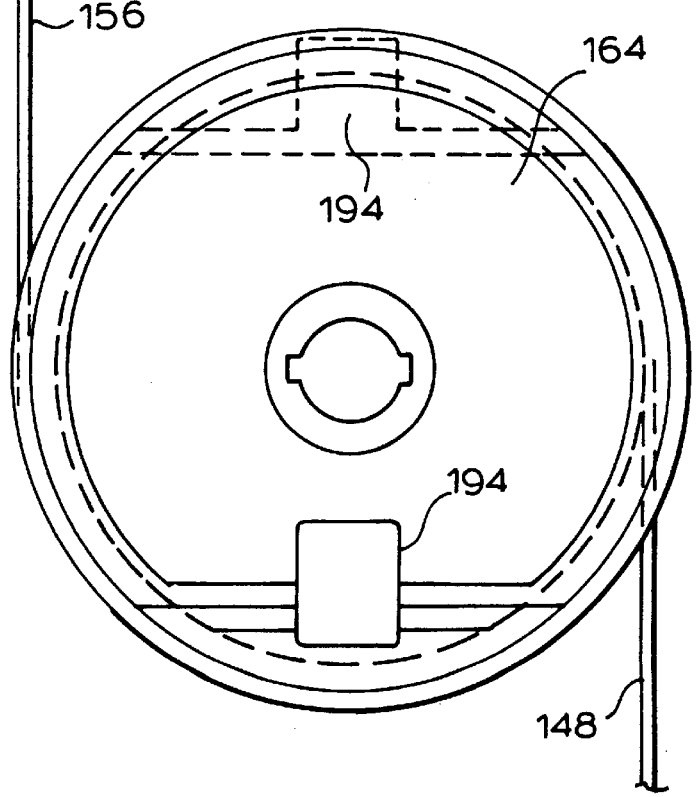

WHEEL MOUNTING ASSEMBLY FOR INSTALLING A TRANSMISSION-BASED ANTI-LOCK BRAKING SYSTEM SENSOR THEREON

CROSS-REFERENCE TO RELATED APPLICATIONS

This application claims the benefit of U.S. Provisional Application No. 60/008,331 filed Dec. 7, 1995.

FIELD OF THE INVENTION

The present invention relates to trucks and other motorized vehicles with a cargo box. More specifically, the present invention relates to trucks and the like wherein the cargo box may be moved vertically between at least one lowered position wherein cargo may be more readily loaded in and removed from the box and at least one upper position wherein the truck may be safely driven.

BACKGROUND OF THE INVENTION

Trucks such as pickup trucks and the like are often used to transport small cargo loads and/or to make deliveries and pickups. One of the difficulties of using such trucks is that of loading and unloading heavy or awkward cargo when a loading dock of proper height is not available. For example, the cargo box of a pickup truck can be three or more feet off of the ground, making it difficult to load or unload cargo to and from the cargo box.

Various attempts have been made in the past to make it easier to load and unload cargo. For example, Canadian patent application no. 2,145,259, published Sep. 23, 1995, illustrates a vehicle having a U-shaped chassis with a drop tray decking. The tray is powered by hydraulics at each corner of the decking to raise and lower the tray. However, such a system requires a sophisticated control system for activating the hydraulics to ensure that each of the hydraulic cylinders operate simultaneously.

U.S. Pat. Nos. 4,902,188 to Page and 5,288,197 to Harris show systems wherein the cargo platform of a vehicle and a trailer, respectively, is lowered by pivoting the platform rearward and downward to facilitate easier loading and unloading of cargo. These systems suffer from the fact that they require a clear space behind the vehicle or trailer to allow the cargo platform to move rearward as it is pivoted downward.

Vehicles according to U.S. Pat. No. 4,902,188 to Page were briefly offered for sale in the United States under the trademark KELPIE KARGO. However, such vehicles were not commercially successful.

On some vehicles, the antilock braking system sensors are mounted on the rear differential of the drivetrain. On removing the rear axle to convert such vehicles to have an elevating cargo box, it was discovered that the antilock braking system brakes would not function properly without the sensor. Further, certain manufacturers use the antilock braking system sensor as a digital input for the speedometer and without a sensor, the speedometer would not operate.

SUMMARY OF THE INVENTION

It is an object of the present invention to provide a novel vehicle which includes a cargo box which can be moved between an elevated and lowered positions to facilitate cargo loading and unloading.

According to a first aspect of the present invention, there is provided a wheel mounting assembly for installing an transmission-based anti-lock braking system sensor thereon. The assembly comprises a stub axle; an anti-lock braking system sensor mounted relative to the stub axle; a hub rotatably mounted on the stub axle; and a disc mounted for rotation with the hub, the disc having a plurality of apertures circumferentially spaced on a face thereof for passing the anti-lock braking system sensor as the disc rotates.

BRIEF DESCRIPTION OF THE DRAWINGS

Embodiments of the present invention will now be described, by way of example only, with reference to the attached Figures, wherein:

FIG. 3 is a rear perspective view of the vehicle of FIG. 1 with the tailgate opened and the cargo bed in an elevated condition;

FIG. 4 is a rear perspective view of the vehicle of FIG. 1 with the tailgate opened and the cargo bed in a lowered condition;

FIG. 6 is a reverse cut away perspective view of the subframe assembly of FIG. 5;

FIG. 7 is a sectional view of the beam of the subframe assembly of FIG. 6;

FIG. 8 is a perspective view of the cut end of the chassis of the passenger compartment of the vehicle of FIG. 1;

FIG. 14 is a sectional view of the pulley system for the drive system of FIG. 13;

FIG. 15 is a side elevational view of the pulley spool of the drive system of FIG. 13;

FIG. 16 is a sectional view of the pulley spool of FIG. 15;

FIG. 17 is a partial perspective view of the end frame assembly of the subframe assembly of FIG. 6;

FIG. 21 is a side elevational view of the vehicle of FIG. 1.

DETAILED DESCRIPTION OF THE INVENTION

A vehicle in accordance with a first embodiment of the present invention is indicated generally at 10 in FIGS. 1–4.

Vehicle 10 includes a passenger compartment 12 and a cargo area 14. As used herein, it is intended that the term passenger compartment can comprise any driving station for a vehicle operator, whether enclosed or not, and may also include an engine compartment, a chassis, front suspension and prime mover means, etc.

In a present embodiment, vehicle 10 comprises a four-wheel drive pickup truck which has been modified by removing the rear wheel drive shaft, differential and axle. The transmission is provided with a cover plate to close the opening created by the removal of the rear wheel drive shaft. It is understood that a front wheel drive transmission would be preferable if commercially available.

Figure 5:
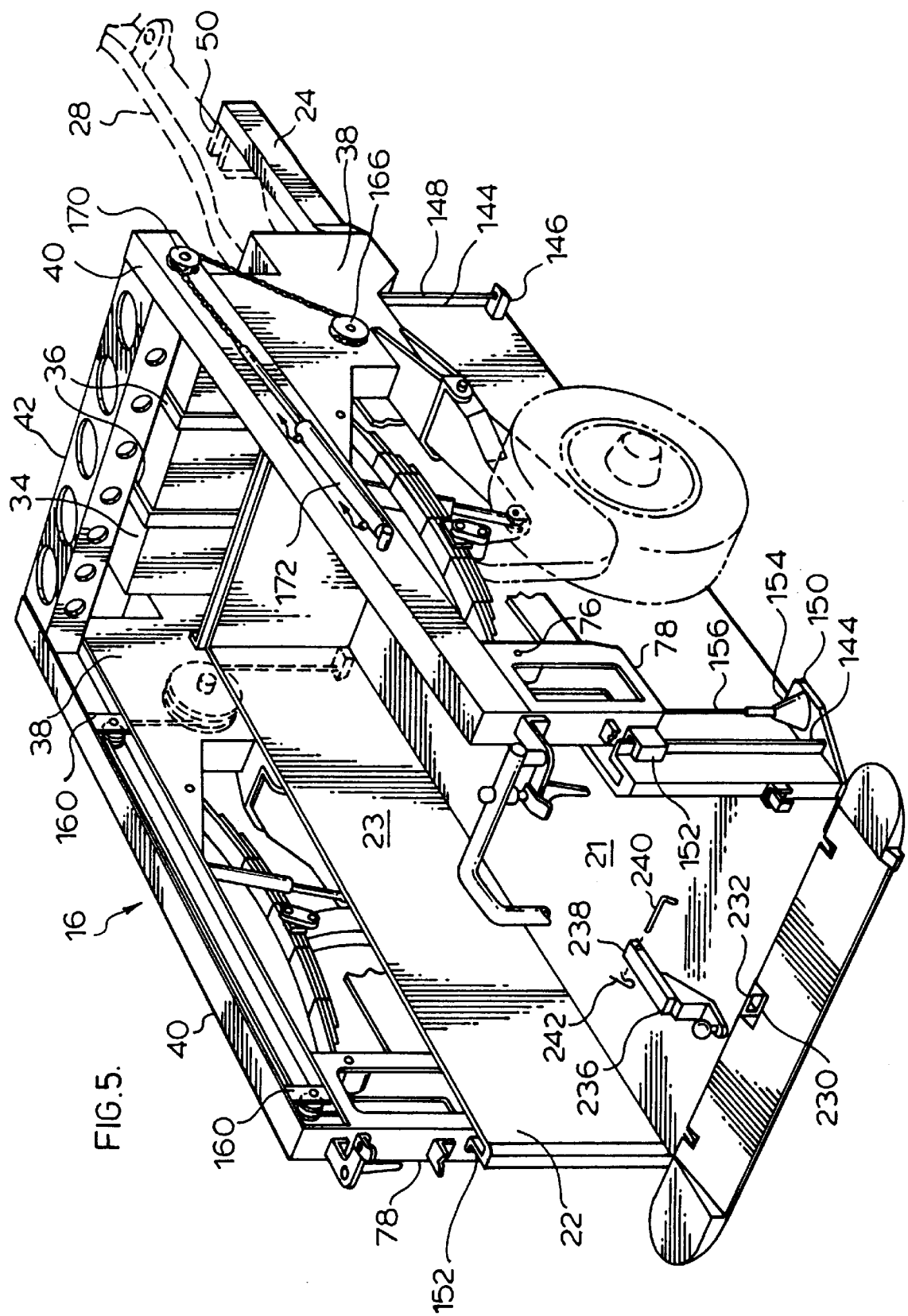
FIG. 5 is a cut away perspective view of the subframe assembly of the vehicle of FIG. 1.

The chassis of vehicle 10 which extended behind passenger compartment 12 has been removed and replaced with a cargo chassis or subframe 16, best seen in FIGS. 5 and 6. The cargo chassis 16 is shrouded with fenders 18 and 20. Fenders 18 and 20 can be recovered from the originally provided vehicle before conversion or directly from an automotive parts supplier. The outer body panels 18 and 20 may be refitted about the cargo chassis 16 to substantially mimic the original side appearance of vehicle 10.

Figure 1:
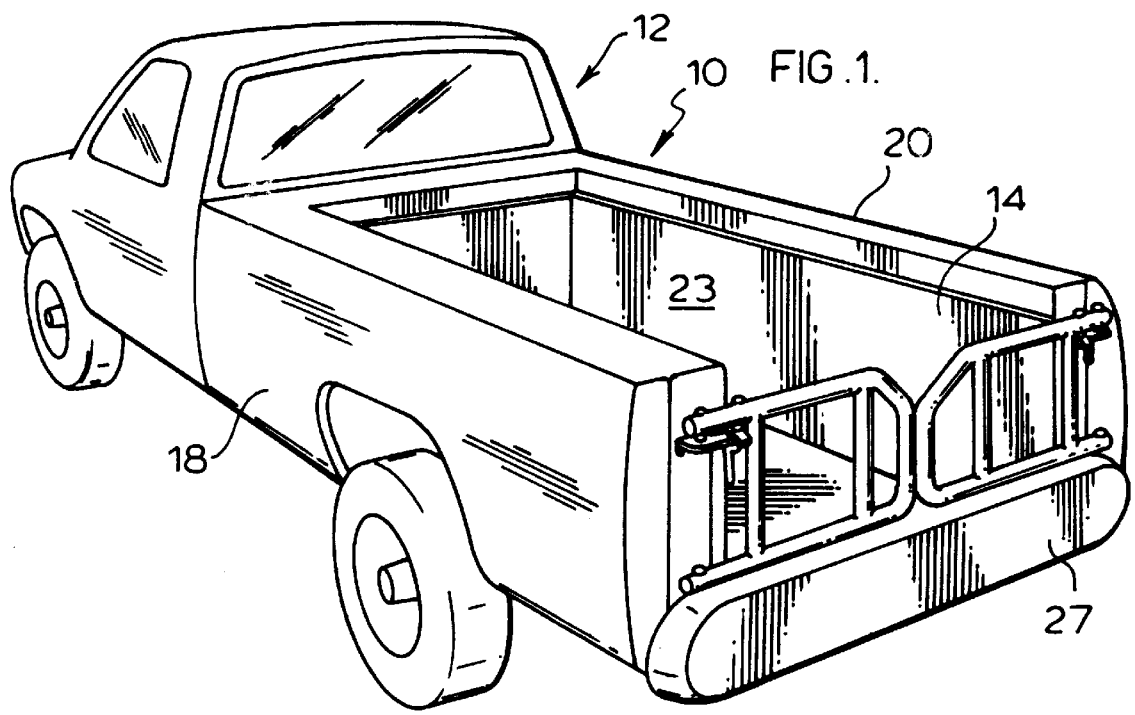
FIG. 1 is a side perspective view of a vehicle embodying the present invention with the tailgate closed and the cargo bed in an elevated condition.
Figure 2:
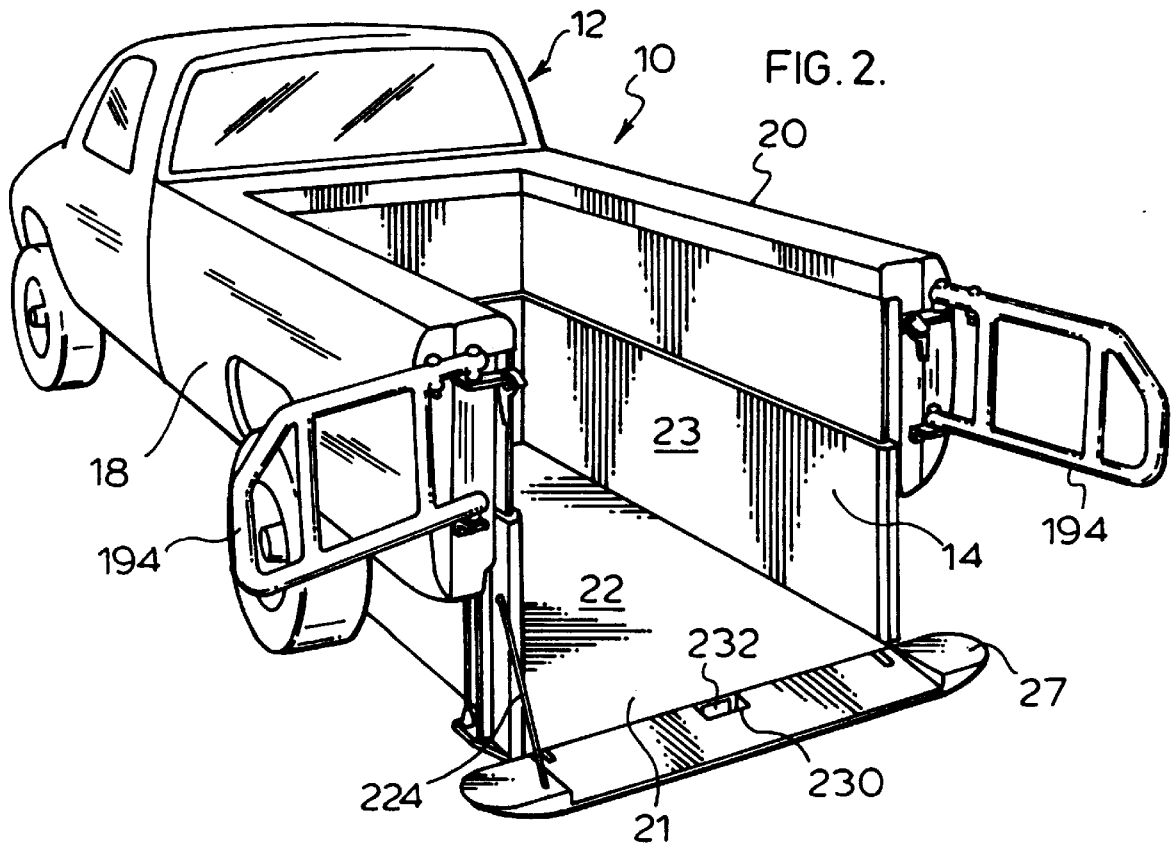
FIG. 2 is a side perspective view of the vehicle of FIG. 1 with the tailgate opened and the cargo bed in a lowered condition.

FIGS. 1–4 generally illustrate the vehicle 10 of the present invention in the various conditions. In FIG. 1, the vehicle 10 is illustrated in a driving condition with the cargo box 22 in an elevated condition. FIG. 2 illustrates the vehicle 10 in a loading condition with the cargo box 22 in a lowered condition. FIGS. 3 and 4 illustrate the cargo box 22 of vehicle 10 moving between an elevated position and a lowered position.

The cargo box 22 of vehicle 10 comprises a rectangular box structure, with a floor 21, two side walls 23 and an end wall 25 with a open top. Bumper 27 is hingedly connected to a rear edge of floor 21 of the cargo box 22. The cargo box 22 is preferably made of a corrugated steel with laterally extending cross members for stiffening the cargo box 22. The cargo box 22 has a minimum size of slightly in excess of 4 feet by 8 feet, the size of a standard sheet of plywood. In order to achieve the minimum size, the rear track of the vehicle is increased by about 5 inches.

Referring to FIGS. 5 and 6, the cargo chassis 16 comprises a pair of arms 24 which extend forwardly to straddle the vehicle chassis 26 of passenger compartment 12. Vehicle chassis 26 has two parallel longitudinally extending frame members 28. Generally, arms 24 and frame members 28 have a boxed structure for rigidity.

A rectangular cross frame 30 is mounted between arms 24 to extend generally perpendicular thereto. Rectangular cross frame 30 extends vertically to be situated behind passenger compartment 12 with the lower member 32 of the frame extending between the rear end of arms 24. Rectangular cross frame 30 generally comprises boxed or structurally rigid components. Preferably, lower member 32 is an open U-shaped beam with the open channel pointing upwardly. Side members of the cross frame 30 are boxed. Upper member 42 is a U-shaped beam with the open channel pointing downwardly. Side members extend into the U-shaped channels of the upper member 42 and lower member 32 and welded or bolted to form an integrated frame 30.

Fuel tank 34 rests within the U-shaped beams of lower member 32 and secured thereto by straps 36 and is thus nested within rectangular cross frame 30 and protected from road debris and collision impact. In order to accommodate the fuel tank 34, the length of the vehicle is increased accordingly.

Integrated with the rectangular cross frame 30 is a gusset 38, which is a boxed structure located on each side of cross frame 30. A pair of structural support members or beams 40 extend rearwardly from rectangular cross frame 30 to define a generally U-shaped perimeter about cargo area 14 with top member 42 of rectangular cross frame 30 forming the bight of the U and to provide additional support for beams 40 which extend rearwardly in a cantilevered manner. Preferably, top member 42 has a plurality of weight-reducing holes cut on each face thereof. Each gusset 38 is connected to a respective side of rectangular cross frame 30 and a respective one of beams 40 and acts a corner brace for supporting the beam 40.

As is apparent to those of skill in the art, the above-described structure results in cargo area 14 being an open U-shaped area, when viewed from above, with no cross members or structures extending between the beams 40 of the U.

In the presently preferred embodiment and referring to FIG. 7, beams 40 are fabricated from inner C-shaped members 44 and outer C-shaped members 46 which are arranged in a nested manner with the arms of the C's being adjacent to each other and forming a boxed channel and an inner open channel along the length of the beam. The C-shaped members are fixed together preferably via spot welding to form beams 40. It has been found that this particular arrangement provides effective structural support for the cargo chassis 16 without significantly increasing weight. It is understood to those skilled in the art that other structural arrangements for beams 40 could also be used. The boxed channel is used to conduit electrical wiring to the rear end of vehicle 10.

Figure 9:
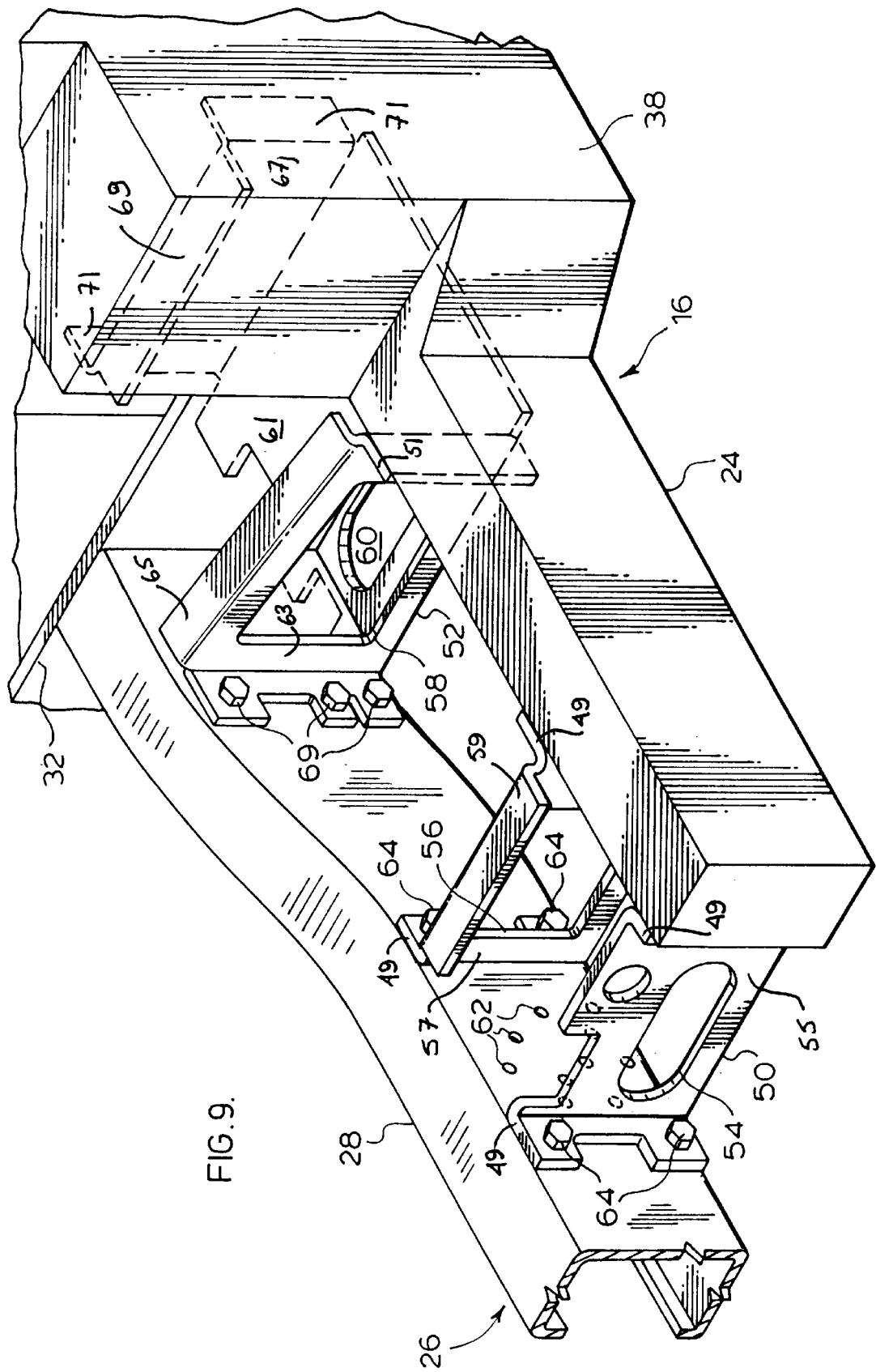
FIG. 9 is a perspective view of the attachment of the subframe assembly to the chassis of the passenger compartment of the vehicle of FIG. 1.

Referring to FIG. 8 and 9, each of the frame members 28 of vehicle chassis 26 is truncated rearwardly of the passenger compartment in a stepped manner. The step 48 is sized to extend under the lower frame 32 of rectangular frame 30. Brackets 50 and 52 connect the cargo chassis 16 to the vehicle chassis 26.

Bracket 50 has a base plate 53 and integral side plates 55 and 57 extending upwardly therefrom. Side plates 55 and 57 have flanges 49 extending perpendicular thereto for connection between the frame member 28 and arm 24. Additionally side plate 57 has a flange 59 extending perpendicular thereto.

Bracket 52 has a base plate 61 and an integral side plate 63. Side plate 63 has a flange 65. Base plate 61 has an end plate 67 having a stiffening flanges 69 and 71. End plate 67 abuts with and is welded to rectangular cross frame 30.

The brackets 50 and 52 and the arms 24 are specifically designed to fit each of the chassis of vehicles manufactured by different companies. The brackets have an open topped U-shaped structure to provide adequate static stiffness and strength for the connection bearing in mind that all of the longitudinal forces for accelerating the vehicle and torsions forces caused by uneven weight distribution are transmitted through brackets 50 and 52. Generally the brackets will have cut-outs 54, 56, 58 and 60 on the transversely extending side plates 55 and 57 and base plate 61 and side plate 63, respectively. The purpose of the cut-outs is first to reduce the strength of the brackets allowing twist during impact. These cut-outs are intended to encourage crumpling during a vehicle collision. An additional advantage is that the cut-outs reduce the weight of the vehicle.

Frame members 28 are generally provided by the vehicle manufacturer with holes 62. These holes define "crumple" zones which are predetermined zones of weakness. The crumple zones are designed for safety reasons so that during a collision the frame will first crumple at the crumple zones rather than some unknown location. In this manner, the dynamics of the vehicle chassis become more predictable so that the passengers of the vehicle may be protected during a collision.

Brackets 50 are connected to the vehicle frame 28 at the crumple zones. Each side plates 55 and 57 straddle the crumple zone. Bracket 52 is spaced rearwardly of bracket 50 to transmit torsional forces between the cargo chassis 16 and the vehicle chassis 26. In this embodiment, rivets or bolts 64 are used to connect the brackets 50 and 52 between the vehicle frame 28 and the arms 24. It is understood that other methods of connections may also be used.

Surprisingly, it has been found that by attaching the cargo chassis 16 to the vehicle chassis 26 at the crumple zones, the deceleration forces experienced within the passenger compartment 12 during a front impact crash test was significantly lower than the original vehicle. Safety regulations in Canada and the United States of America limit the level of forces in a front impact test to be about 45 G forces. The vehicle 10 of the present invention experienced about 27 G's, significantly below the safety limits despite predictions by the safety regulators that the forces would be in excess of 100 G's. Inspection of the crashed vehicle of the present invention provides evidence that because of the attachment straddling the crumple zones, the frame 28 crumpled causing the brackets 50 to crumple directing the arms 24 downwardly directing the G forces of the cargo chassis 16 to impact the ground protecting the passenger compartment from excessive G forces.

Figure 10:
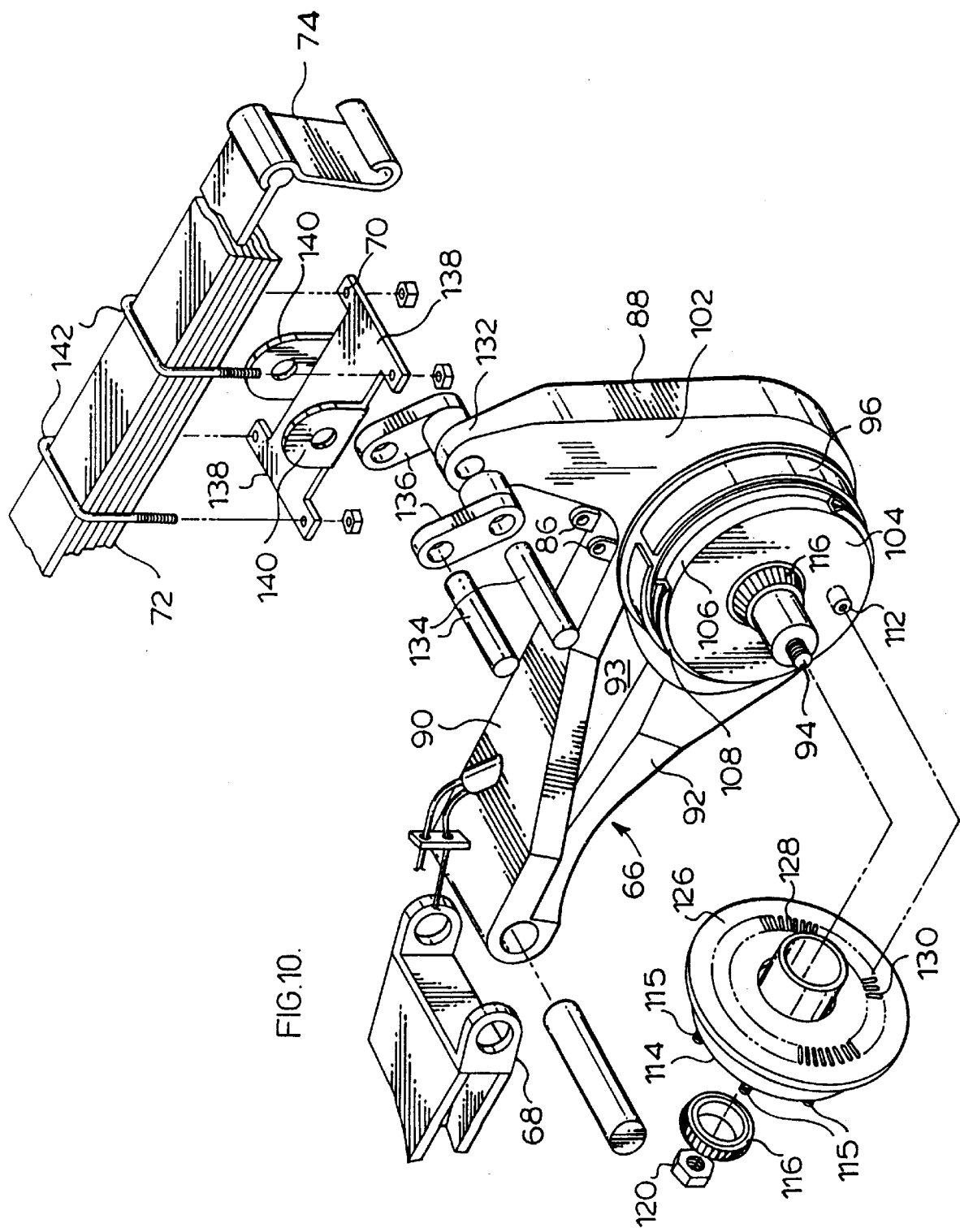
FIG. 10 is an exploded perspective view of the suspension system of the vehicle of FIG. 1.
Figure 11:
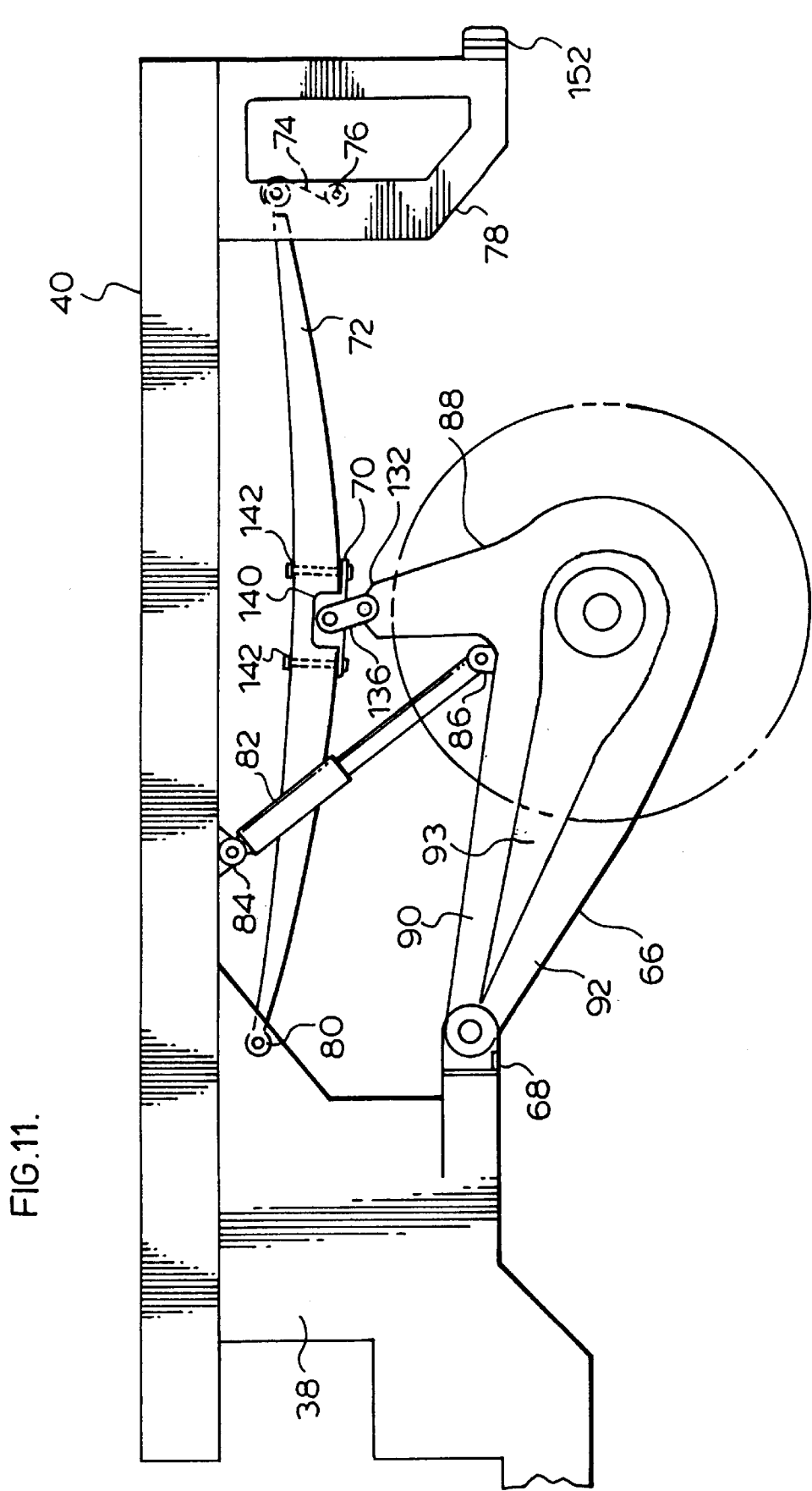
FIG. 11 is a side elevational view of the suspension system of FIG. 10.

Referring to FIG. 10, a pair of wheel carriers 66 are each pivotally connected to mount point 68 on a respective side of rectangular cross frame 30 and each wheel carrier 66 includes a spring connector 70 to connect to a respective leaf spring 72 to form a trailing link suspension.

To allow the desired proper motion of wheel carriers 66, a rear end of each leaf spring 72 is pivotally connected to a spring mounting link 74. The spring mounting link 74 is pivotally connected to a respective spring mount member 76 which is fastened to a respective beam 40 on open rectangular end frame 78, which extends downwardly at the end of beams 40. The forward end of the leaf spring 72 is pivotally mounted at pivot 80, which is mounted on gusset 38. An inner panel 79 extends from end frame 78 to gusset 38 on each side of the cargo area 14. Panel 78 is made preferably from a corrugated metal material. The panel 79 protects the suspension and the cargo area 14 from the cargo box 22. However, rigidity of the cargo area 14 is improved through the use of the inner panels 79. Further, outer body fenders 18 and 20 can be connected to the inner panels 79.

A shock absorber 82 extends between each of wheel carriers 66 and beams 40 on each side of vehicle 10. Beam 40 has a shock absorber mount 84 on an underside thereof for receiving shock absorber 82. Similarly wheel carriers 66 have shock mounts 86 for pivotally securing the shock absorber 82 thereto.

Each wheel carrier 66 has a generally tear drop shaped body and an arm 88. The body has an upper section 90 and a lower section 92 which merge arcuately at opposite ends. In the preferred embodiment, the arm 88, upper section 90 and lower section 92 are enclosed boxes with a common inside plate 93 to improve structural integrity, minimizing flexure. Upper section 90 has an opening 91 for receiving brake fluid cable 95 and antilock braking sensor cable 97 which connect to the brake assembly 96 and the antilock braking sensor 112.

A stub axle 94 is mounted on the wheel carrier 66 at the wide end thereof. Mounted about the stub axle 94 are brake assemblies 96 which can be recovered from the original vehicle. Brake assemblies 96 are mounted in a conventional manner.

Figure 12:
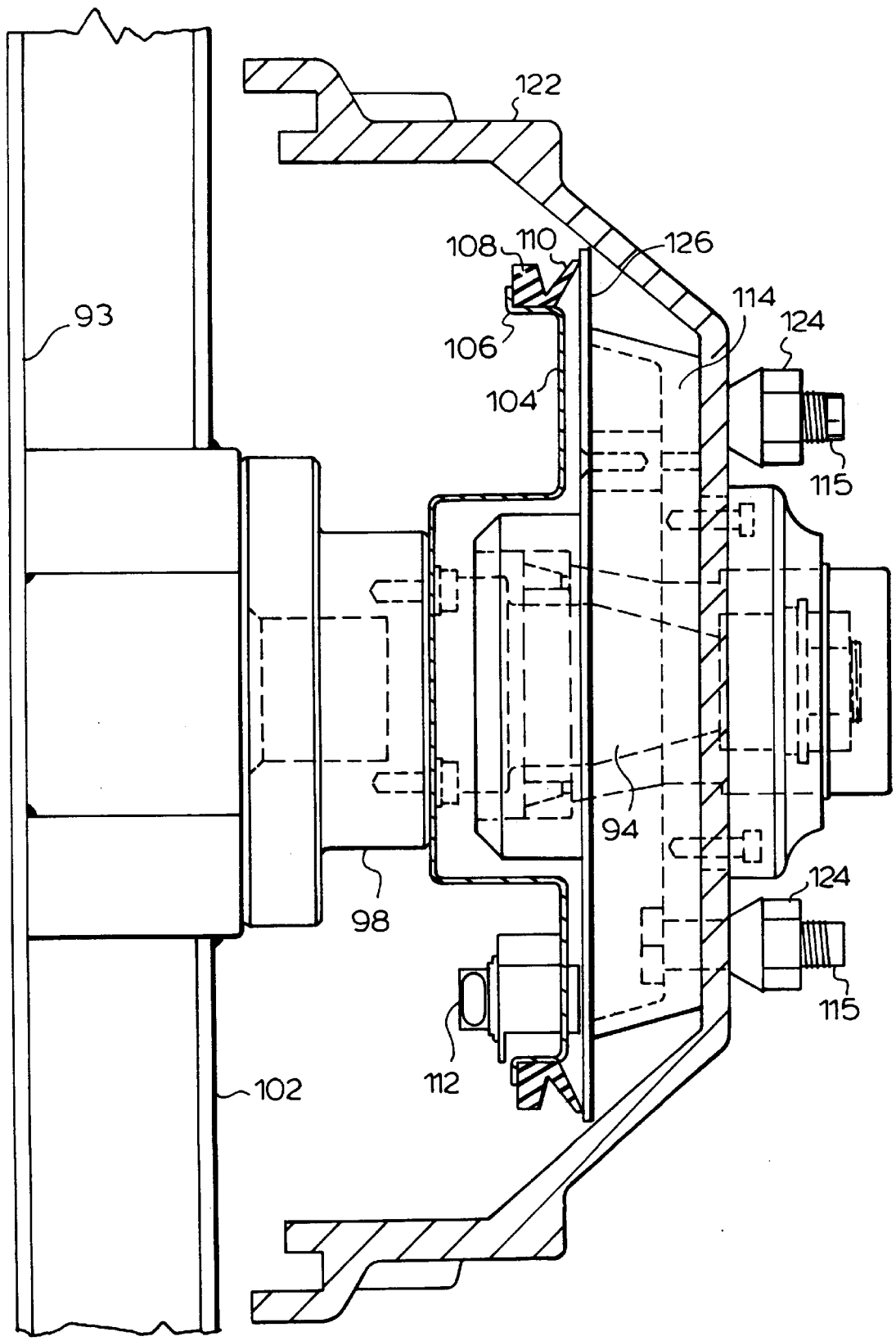
FIG. 12 is a sectional view of the hub assembly of the suspension system of FIG. 10.

Referring to FIG. 12, the wheel hub assembly is illustrated in greater detail. The stub axle 94 is bolted to a cylindrical base mount 98 which is bolted to a base collar 100. Base collar 100 has a thickness slightly greater than the thickness of wheel carrier 66 and is welded to the inside plate 93 and the outside plate 102.

On one wheel of the vehicle 10, a shroud plate 104 is mounted between the stub axle 94 and the base mount 98. Shroud 104 has a concentric well and an annular lip 106. Sealing ring 108 has a flange 110 extending outwardly. Shroud 104 has an Antilock braking system sensor 112 mounted thereon.

Hub 114 has a central aperture for mounting on stub axle 94 in a conventional manner using roller bearings 116 and locking nut 120. Hub 114 has bolts 115 extending therefrom to receive the wheel 122 of the vehicle in a conventional manner using nuts 124. On the one wheel of the vehicle 10, hub 114 is further provided with a plate 126 on an inside surface thereof. Plate 126 has a plurality of spaced apertures extending circumferentially thereabout. The apertures 128 are on a radius to cooperate with the sensor 112. Ring 108 cooperates with the plate 126 to provide a sealed environment for the sensor 112.

On some vehicles, the antilock braking system sensors were mounted on the rear differential of the drivetrain. On removing the rear axle to convert such vehicles to the present invention, it was discovered that the antilock braking system brakes would not function properly without the sensor. Further, certain manufacturers use the antilock braking system sensor as a digital input for the speedometer and without a sensor, the speedometer would not operate. Conventional sensors measure speed of rotation of the axle by magnetically sensing the number of teeth used in differential gearing which pass by the sensor. In order to simulate the requisite number of teeth passing by the sensor, the plate 126 has a plurality of spaced apertures 128. The number of bars 130 between the apertures 128 is the same number as teeth of the gear which would be sensed in the conventional vehicle. In this mainer, the sensor of the original vehicle could be used in the present invention without the need for re-validating the antilock braking system.

The upper end of arm 88 has a pivot mount 132. Pins 134 pivotally connect links 136 to the leaf spring connector 70. Leaf spring connector 70 has a base plate 138 having pivot mounts 140 extending upwardly therefrom. Mounts 140 pivotally connects to the links 136. U-bolts 142 attaches the spring connector 70 to the leaf spring 72 in a conventional manner.

Referring back to FIG. 5, the cargo box 22 has a guide track 144 at each corner thereof. The forward two guide tracks 144 are connected to bar 146 at the bottom of cargo box 22. Forward cable 148 is secured to the bar 146. The rearward two guide tracks 144 are connected to plate 150. Rectangular end frames 78 each has a guide 152 for slidably receiving the rearward two guide tracks 144. Similarly, gusset 38 has guides 152 for receiving the forward two guide tracks 144. Preferably guides 152 are U-shaped and oriented to present a vertical slot. The cargo box 22 is thus able to slide relative in the guides 152 in a guided manner. A pliable plastic insert 156 acts a bearing to minimize jamming of the cargo box 22 as it travels therein.

Cone 154 is mounted on plate 150. Cone 154 has a central aperture through which rear cable 156 extends. Rear wire 156 is secured to plate 150.

Figure 13:
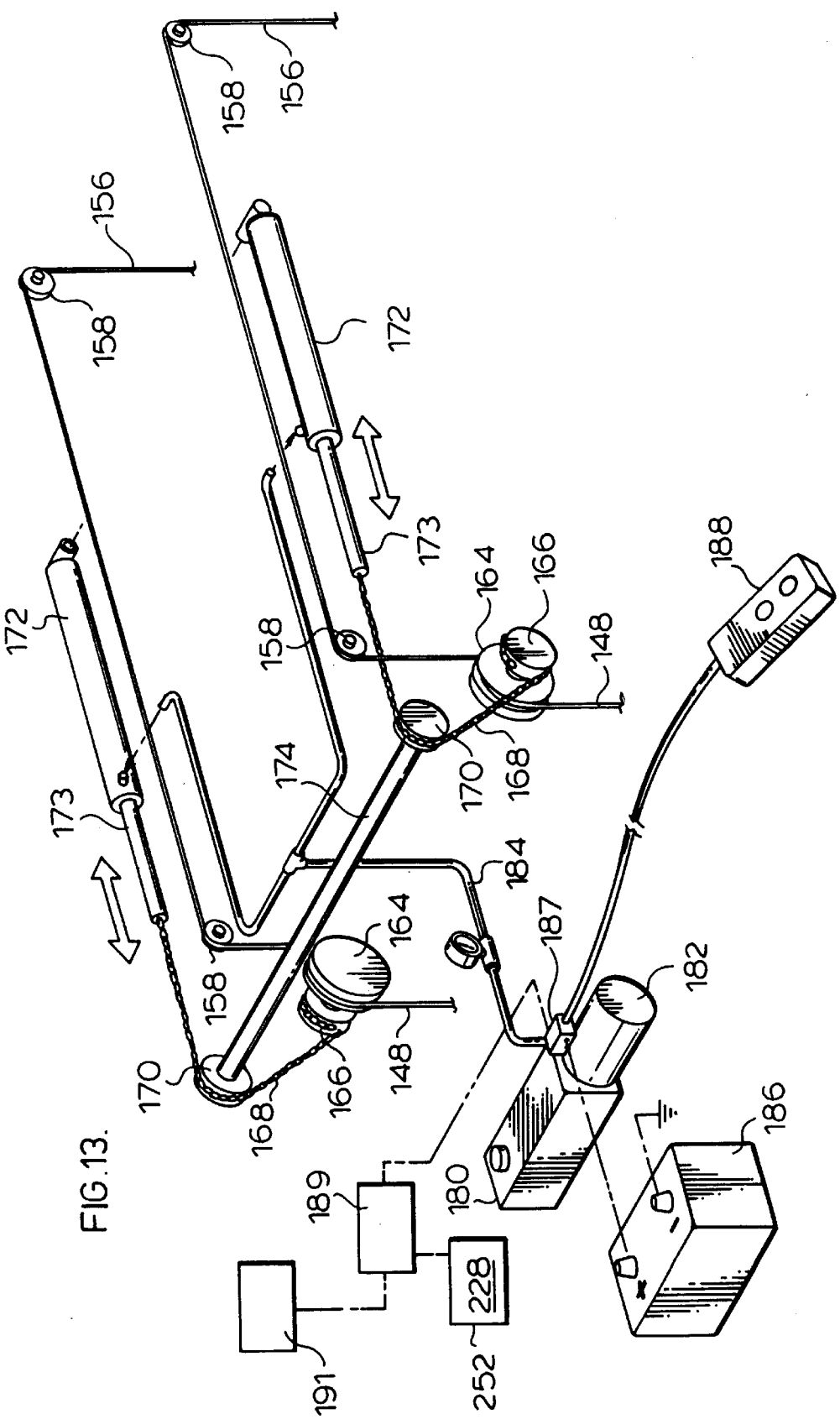
FIG. 13 is a partial perspective view of the lift system for elevating the cargo box of the vehicle of FIG. 1.

Referring to FIGS. 13 and 14 the drive system for effecting the lifting of the cargo box 22 is illustrated. The rear cables 156 extend about pulleys 158 rotatably mounted in four corners of the open section of beams 40. Plate 160 and inner C-member 44 support axle 162. Rear cables 156 connect on each side to spools 164 which are rotatable mounted and housed in gussets 38. An inside wall of gusset 38 is provided with an access opening and an access plate to allow for installation and servicing of spools 164. Chain pulleys 166 are co-axially mounted with spools 164 on the outside of gussets 38. Chains 168 wraps about chain pulleys 166, about idler pulleys 170 to connect with drive cylinders or rams 172. Idler pulleys 170 are mounted on the outside face of beams 40. Idler pulleys 170 are ganged together by tube 174. Drive cylinders 172 are mounted on the outside face of beams 40. Chain pulleys 166 and idler pulleys 170 have a circumferential surface having recesses for complementarily receiving alternating chain links of drive chain 166. In the preferred embodiment, chain 166 is a closed link chain. It is understood that other types of power transmission systems, namely, toothed belts systems, roller chain and toothed gear systems, would provide suitable results. Optionally, cover plates 176 and 178 (as best seen in FIG. 6) can be used to protect the drive system from damage and debris.

A hydraulic reservoir 180 contains a hydraulic fluid and is in fluid communication with pump 182. Pump 182 connects with a fluid line 184 which communicates with each of the drive cylinders 172. Pump 182 is electrically connected to the main battery 186 of the vehicle. A control means is electrically connected to the pump 182 for energizing the pump and the solenoid valves for controlling the pressure and flow of the hydraulic fluid. Pump 182 may be located in passenger compartment 12 or any other suitable location as would occur to those of skill in the art.

Control means 187, may comprise any suitable control device such as a PLC, microcontroller or, in the simplest embodiment, an electrical switch 188, and is operable to cause hydraulic ram 172 to extend or retract as desired. When control means 187 is other than a simple electrical switch, control means 187 may also generate one or more safety interlock signals, as described below. Further, control means 187 may be responsive to a safety interlock 189 linked to the transmission 191 of the vehicle. The safety interlock 189 would monitor the transmission and send a signal to prevent raising or lowering of cargo box 22 when the vehicle 10 is in an unsafe condition, i.e.—not in Park, or with the handbrake released.

In the presently preferred embodiment of the invention, hydraulic rams 172 are supplied with pressurized hydraulic fluid from an electrically operated pump unit 182, and hence hydraulic rams 172, are controlled by a control means 187.

Referring to FIGS. 15 and 16, the spool 164 is illustrated in greater detail. The spool 164 has two circumferential V-grooves 190 and 192 for receiving cables 148 and 156, respectively. Groove 190 has a diameter which is less than the diameter of groove 192. Cables 148 and 156 wrap about the grooves 190 and 192, respectively and are connected to the spool 164 at receptacles 194. The ends of cables 148 and 156 can be securely attached in the receptacles 194.

The diameter of the V-grooves 190 and 192 are sized so that upon ¾ of a revolution of the spool 164, the entire lift of cargo box 22 can be achieved. Since the diameters of V-grooves 190 and 192 are different the amount of travel which will be experienced by ends of the cargo box 22 will be different. The rear cable 156 will travel a greater distance than forward cable 148.

It will be apparent to those of skill in the art that cables 148 and 156 must have sufficient tensile strength to support the combined weight of cargo box 22 and the cargo carried therein. In the presently preferred embodiment, aircraft quality cable is employed although other suitable cables may be employed if desired.

Referring to FIG. 17, a block 226 is secured to an inside face of each of the end frames 78. Block 226 has a central aperture extending therethrough and is aligned with the path of the rear cables 156. Rear cables 156 are threaded through the aperture. The bottom end of the aperture has a conical opening 228 which will cooperate with the cones 154.

Figure 18:
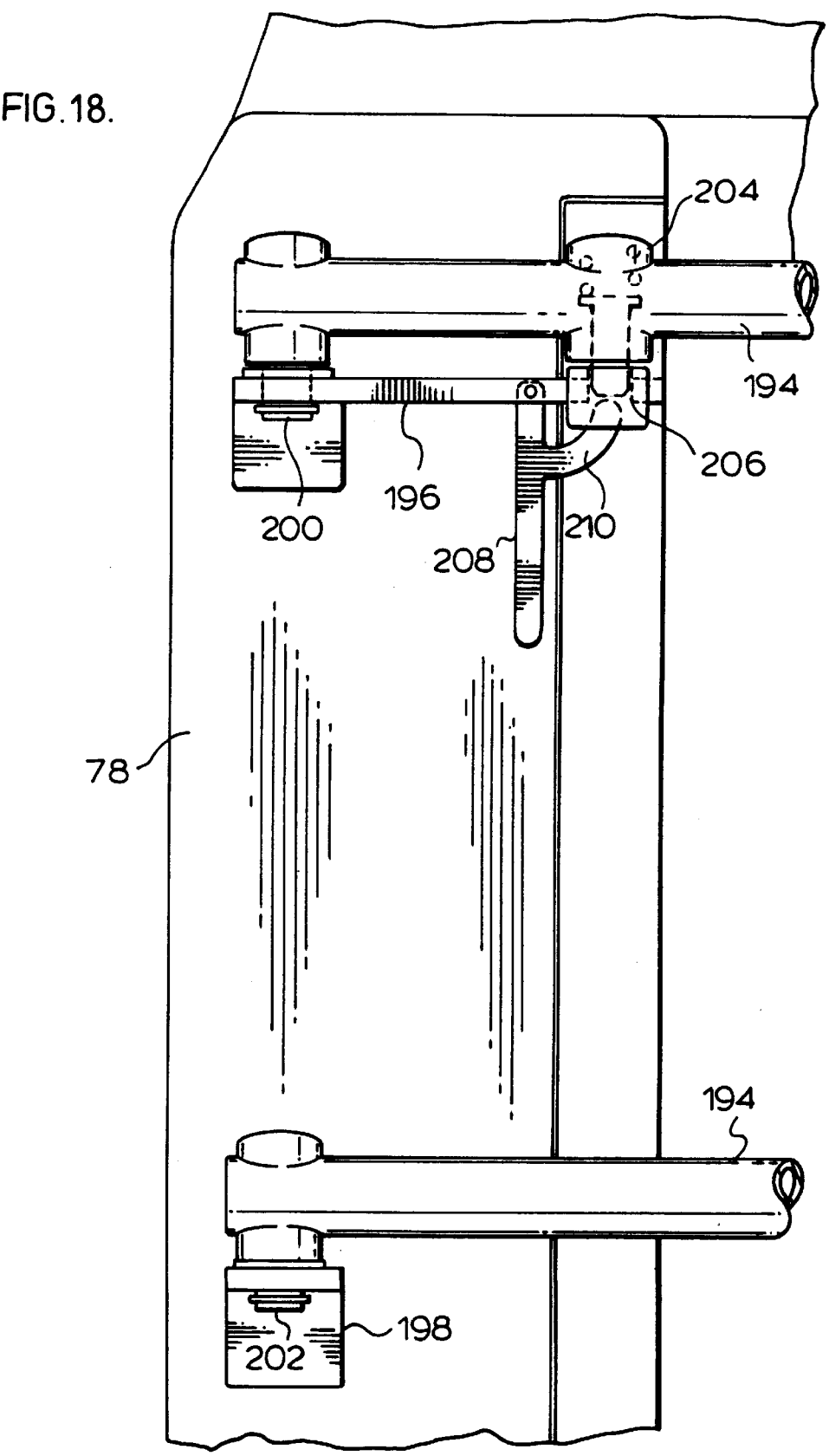
FIG. 18 is an end elevational view of the tailgate of the vehicle of FIG. 1.

Referring to FIGS. 17 and 18, tailgates 194 are pivotally mounted on each side of the vehicle on mounting plates 196 and 198 on pivot pins 200 and 202, respectively. Mounting plates 196 and 198 are secured onto the end frame 78. Tailgates 194 are illustrated as tubular rectangular structures sized to extend across half of the cargo box 22. However, it is understood that more conventional styled tailgates could also be used.

Tailgates 194 each has a spring-loaded locking pin 204 which cooperates with a locking aperture 206 in mounting plate 196. Lever 208 is pivotally connected to the mounting plate 196 and hangs in a vertical position. Lever 208 has an arcuate arm 210. By pushing lever arm 208 towards the pin 204, the end of pin 204 is urged out of the aperture 206 releasing the tailgate 194 to freely swing for opening. The tip of pin 204 is tapered such that when the tailgate 194 is closed, the pin 204 will retract when engaging the mounting plate 196. Upon further closing of the tailgate 194 the locking pin 204 will be urged to extend through the aperture 206 to lock the tailgate 194 in position. Sufficient size and strength of the locking pin 204 and the bias spring therefore will ensure that the tailgate 194 will remains closed keeping cargo in the cargo box 22.

Figure 19:
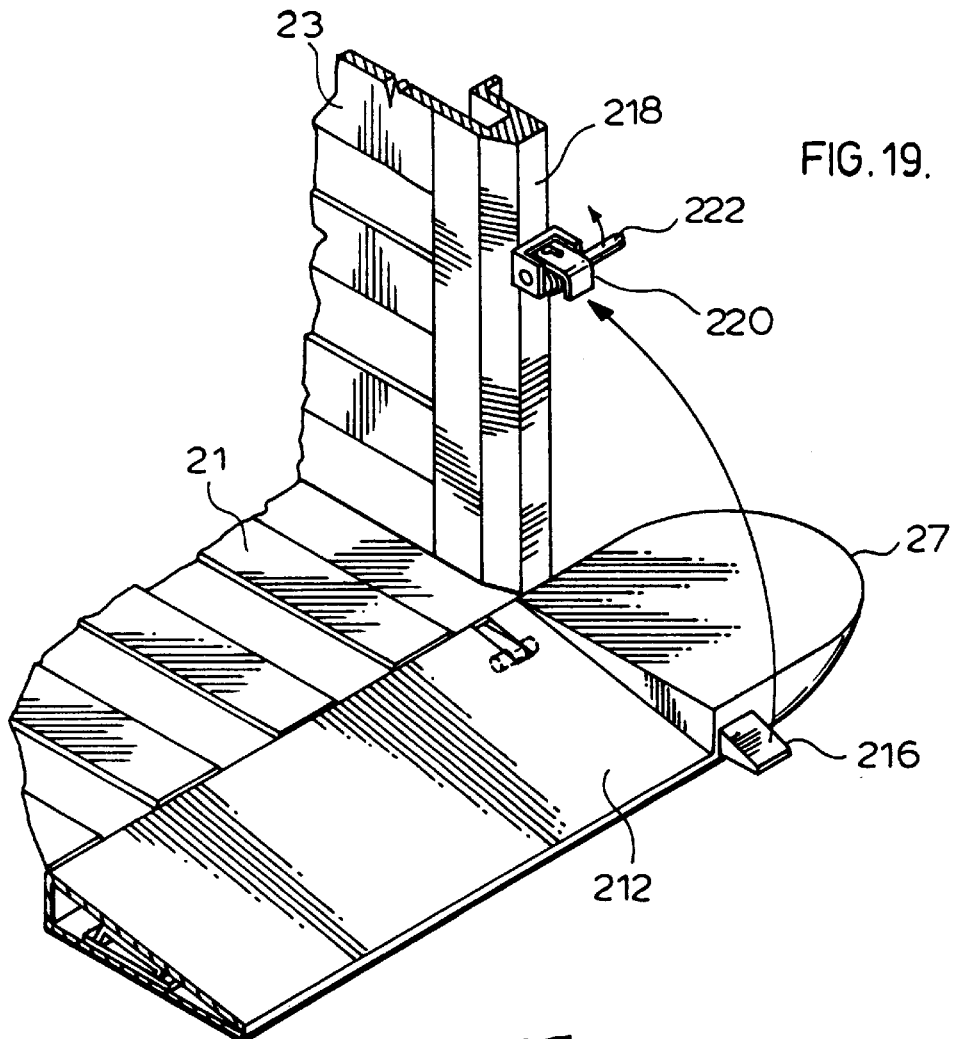
FIG. 19 is a partial perspective view of the bumper assembly of the cargo box of the vehicle of FIG. 1.
Figure 20:
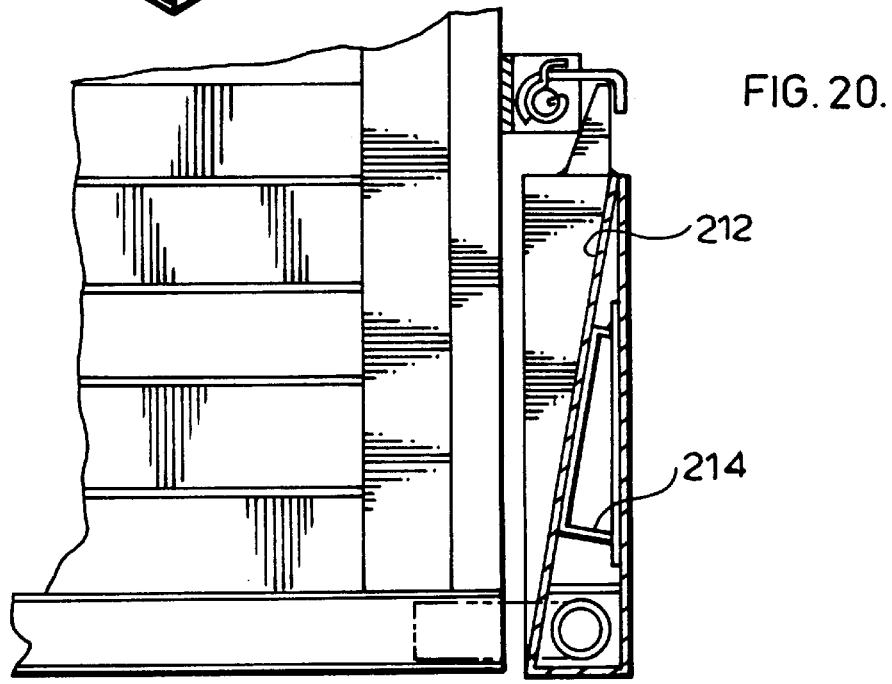
FIG. 20 is a partial side sectional view of the bumper assembly of FIG. 19.

Referring to FIGS. 19 and 20, the rear bumper 27 is illustrated in greater detail. The bumper has a ramp 212 extending the width of cargo box 22 which is substantially triangular in cross section. Ramp 212 has internal supporting ribs 214 to provide structural integrity. It is understood that the structural integrity of the bumper is dictated by and complies with applicable safety regulations.

One end of bumper 27 has a tab 216. A latch 220 is mounted on the rear edge 218 of side wall 23. Latch 220 is positioned to engage tab 216 to releasably lock the bumper in a closed condition. Latch 220 comprises a simple biased catch 222 for closing the cargo box 22 preventing any cargo from sliding off.

The opposite end of bumper 27 has a cable 224 as best illustrated in FIGS. 2 and 4. The cable 224 extends from a rear edge of the cargo box 22 and an upper edge of the bumper 27. The cable 224 supports the bumper 27 when in a horizontal condition for opening the cargo box 22 facilitating loading and unloading cargo.

Optionally, bumper 27 has a centrally located rectangular aperture 230 situate in the lower edge thereof. Cargo box 22 has similarly sized rectangular aperture 232 between adjacent corrugations of the floor 21. Aperture 232 receives hitch 236 which has a rectangular bar 238 which cooperates with aperture 232. Locking pin 240 and cotter pin 242 lock the hitch 236 within aperture 232.

The inside of the cargo area 14 is covered with panels 244, 246, 248 and 250. The panels 244, 246, 248 and 250 will enclose the cargo area 14 and provide an aesthetically pleasing appearance. Additionally, panel 248 can be fitted with an opening flap for a fitting for receiving fuel for the fuel tank 34.

To convert a cargo area of a four wheel drive vehicle the rear drive train of the vehicle is removed from the vehicle. The rear end of the transmission is closed with a cover plate. The chassis of the vehicle is truncated rearwardly of the passenger compartment. The subframe assembly is attached to the truncated chassis.

Optionally, vehicles could be obtained from an original manufacturer a front wheel drive vehicle with only a front chassis and then the subframe assembly is merely attached to the front chassis.

In operation, cargo box 22 is lowered by extending hydraulic ram 172 to lengthen cables 148 and 156 to lower cargo box 22. The weight of the cargo box 22 and the weight of the cargo will encourage movement of the ram 172. Cargo box 22 may be lowered onto the surface on which vehicle 10 rests, as shown in dashed line in FIG. 21 or to whatever other extent is desired. Tube 174 synchronizes idler puller 170 on each side of the vehicle 10 to rotate at the same rate to maintain the alignment of cargo box 22 with respect to the rest of vehicle 10. The location and routing of cables 148 and 156 cooperate to maintain the floor of cargo box 22 substantially parallel to the surface on which vehicle 10 rests even in the event of an unequal distribution of cargo weight in cargo box 22. However, since the diameters of V-grooves 190 and 192 are unequal the rear of the cargo box 22 will travel a slightly greater extent. This difference accommodates the loading of the cargo box. When the cargo box is loaded, the leaf springs 72 will be depressed. When unloaded, the rear of the vehicle 10 lifts up. Since the travel of the cables 148 and 156 is uneven, the cargo box will remain fully on the ground even after unloading.

In the present embodiment, the hitch 236 must be removed when the cargo box 22 is in an elevated condition, before lowering. Additionally, bumper 27 should also be pivoted to the horizontal condition.

At this point, with cargo box 22 lowered and bumper 27 in a horizontal condition acting as a ramp, tailgate 194 may be opened and cargo can be loaded on to or removed from cargo box 22 as appropriate. If cargo box 22 is lowered to rest on the surface supporting vehicle 10, bumper 27 can be used as a ramp to span the distance from the floor 21 of cargo box 22 and that surface. Depending on the construction of cargo box 22, it is contemplated that this distance may be from one to six inches.

When cargo loading and/or unloading is complete, bumper 27 is raised, tailgate 194 are closed. Hydraulic ram 172 is activated to move ram 173, retracting chain 168, which drivingly rotates pulleys 170 and both pulleys 166 and 164. Cables 148 and 156 are wound on pulleys 164 for lifting cargo box 22. Once the full height has been obtained, cone 154 will be fully registered within conical opening 228 of block 226. At this point a sensor 252 signals the controller 189 releasing the transmission 191 to permit driving.

It is contemplated that, in addition to the enhanced ease with which cargo may be loaded and unloaded, one of the additional advantages of the present invention is the ability to lower cargo box 22 to accommodate cargo of excessive height. For example, if a six foot high box is to be delivered in vehicle 10 it may be desired to place cargo box 22 in an intermediate position clearing the road surface to reduce the extent to which the box extends above the top of passenger compartment 14. This is accomplished by modifying the controller 189 to permit driving in the intermediate position even if the cone 154 is not fully registered within conical opening 228 block 226. It will also be apparent to those of skill in the art that cargo box 22 may be vertically positioned to accommodate loading docks of differing heights.

As will be clear to those of skill in the art, other mechanical connections for lifting and lowering the cargo box are contemplated within the scope of this invention. The drive cylinder could be mounted in different locations where space is available, e.g. behind the driver's and passenger's seats. Depending on the location, the drive will be mechanically connected to the cargo box for effecting the required lifting and lowering thereof.

As will be clear to those of skill in the art, while the embodiment described above has been designed for retrofitting to an existing vehicle, the present invention is not so limited and may be incorporated into a vehicle at its time of original equipment manufacture.

The above-described embodiments are intended to be examples of the present invention and alterations and modifications may be effected thereto, by those of skill in the art, without departing from the scope of the invention which is defined solely by the claims appended hereto.

We claim:

1. A wheel mounting assembly for installing a transmission-based anti-lock braking system sensor thereon, said wheel mounting assembly comprising:

a wheel carrier having upper, lower, and arm portions formed as enclosed boxes, the a stub axle coupled to said wheel carrier;

an anti-lock braking system sensor mounted in fixed relation to said stub axle and said wheel carrier, said anti-lock braking system sensor being configured to detect a predetermined characteristic of a material passing in the vicinity thereof;

a sensor cable for communicating electrically with said anti-lock braking system sensor, a portion of said sensor cable being disposed within said wheel carrier;

a hub rotatably mounted on said stub axle;

a disc mounted for rotation with said hub, said disc having a plurality of apertures circumferentially spaced on a face thereof for passing in the vicinity of said anti-lock braking system sensor as said disc rotates.

2. A wheel mounting assembly as claimed in claim 1 wherein there is further provided a seal for sealing a region between said disc and said anti-lock braking system sensor.

3. A wheel mounting assembly as claimed in claim 2 wherein there is further provided a plurality of bars formed of a material having the predetermined characteristic of a material that said anti-lock braking system sensor is configured to detect, each bar of said plurality of bars being arranged between respective ones of the plurality of apertures.

* * * * *